United States Patent [19]

Bloys et al.

[11] Patent Number: 5,221,489
[45] Date of Patent: Jun. 22, 1993

[54] SULFONATED POLYMERIC DISPERSANT COMPOSITIONS FOR SUBTERRANEAN WELL DRILLING, COMPLETION, AND CEMENTING

[75] Inventors: James B. Bloys; Richard F. Morgan, both of Plano, Tex.

[73] Assignee: Atlantic Richfield Company, Los Angeles, Calif.

[21] Appl. No.: 840,383

[22] Filed: Feb. 24, 1992

Related U.S. Application Data

[63] Continuation of Ser. No. 514,900, Apr. 26, 1990, abandoned.

[51] Int. Cl.$^5$ .............................................. C04B 24/26
[52] U.S. Cl. .................................... 252/8.551; 524/3; 507/122
[58] Field of Search ................ 507/122; 524/3; 526/271; 252/8.551, 8.552; 106/608

[56] References Cited

U.S. PATENT DOCUMENTS

| | | | |
|---|---|---|---|
| 2,650,905 | 9/1953 | Fordyce et al. | 252/8.5 |
| 2,718,497 | 9/1955 | Oldham et al. | 252/8.5 |
| 3,203,938 | 8/1965 | Baechtold | 260/79.3 |
| 3,234,154 | 2/1966 | Martin | 260/17.5 |
| 3,409,080 | 11/1968 | Harrison | 166/31 |
| 3,730,900 | 5/1973 | Perricone et al. | 252/8.5 |
| 3,952,805 | 4/1976 | Persinski et al. | 166/295 |
| 4,036,660 | 7/1977 | Persinski et al. | 106/90 |
| 4,048,077 | 9/1977 | Engelhardt et al. | 252/8.514 |
| 4,207,194 | 6/1980 | Sharpe et al. | 252/8.55 |
| 4,340,525 | 7/1982 | Hübner et al. | 252/8.552 |
| 4,390,672 | 6/1983 | von Bonin | 526/271 X |
| 4,407,321 | 10/1983 | Wilski et al. | 252/8.551 X |
| 4,425,462 | 1/1984 | Turner et al. | 252/8.5 |
| 4,552,939 | 11/1985 | Thaler et al. | 526/287 |
| 4,564,371 | 1/1986 | Ueda et al. | 44/51 |
| 4,568,471 | 2/1986 | Defosse | 252/8.551 |
| 4,581,145 | 4/1986 | Cuisia et al. | |
| 4,631,137 | 12/1986 | Dymond | 252/8.514 |
| 4,646,834 | 3/1987 | Bannister | 252/8.55 |
| 4,797,450 | 1/1989 | Dehm et al. | 525/326.7 |
| 4,962,173 | 10/1990 | Kinoshita et al. | 524/3 X |
| 5,087,648 | 2/1992 | Kinoshita et al. | 524/3 |
| 5,153,240 | 10/1992 | Stephens | 524/3 |

FOREIGN PATENT DOCUMENTS

| | | | |
|---|---|---|---|
| 1163429 | 3/1984 | Canada | 252/8.552 |
| 1258947 | 8/1989 | Canada . | |
| 30425 | 6/1981 | European Pat. Off. . | |
| 3338431 | 5/1985 | Fed. Rep. of Germany | 524/3 |
| 3700535 | 7/1988 | Fed. Rep. of Germany | 526/271 |
| 2533549 | 3/1984 | France . | |

*Primary Examiner*—Gary L. Geist
*Attorney, Agent, or Firm*—Haynes and Boone

[57] ABSTRACT

A dispersant for drilling fluids, spacer fluids, completion fluids, cement slurries and mixtures of drilling fluids and cement slurries used for drilling and cementing subterranean wells.

13 Claims, No Drawings

SULFONATED POLYMERIC DISPERSANT COMPOSITIONS FOR SUBTERRANEAN WELL DRILLING, COMPLETION, AND CEMENTING

This is a continuation of copending application Ser. No. 07/514,900 filed on Apr. 26, 1990 now abandoned.

BACKGROUND OF THE INVENTION

1. Field of the Invention

The present invention pertains to compositions for use in the drilling and completion of subterranean wells. More specifically, the present invention relates to dispersants for drilling fluids, spacer fluids, completion fluids, cement slurries and mixtures of drilling fluids and cement slurries.

2. Description of the Prior Art

Techniques are well known for drilling and completing wells, particularly gas and oil wells, which are drilled from the surface of the earth to a subterranean formation containing a fluid mineral which it is desired to recover. After the fluid-containing geologic formation is located by investigation, a borehole is drilled through the overlying layers of the earth's crust to the fluid-containing geologic formation to permit recovery of the fluid mineral contained therein.

The drilling fluids used during drilling of the borehole are generally classified on the basis of their principal component. When the principal ingredient is a liquid (water or oil) the term "mud" is applied to a suspension of solids in the liquid. The most common drilling fluids contain water as the principal component. These drilling fluids are known as water-base drilling fluids or "water muds".

Water-base drilling fluids vary widely in composition and properties and many have been classified based on their principal ingredients. Some common classifications of water-base drilling fluids are freshwater muds, low solids muds, spud muds, salt water muds, lime muds, gyp muds and CL-CLS muds.

In addition to water, drilling fluids often include any number of known additives which perform various functions in the drilling fluid system. Among the most common additives are materials which increase density such as barite and galena and viscosifiers or thickening agents such as clays (usually bentonite).

Furthermore, many water-base drilling fluids are formulated to contain one or more polymeric additives which serve to disperse the drilling fluid, reduce the rate of filtrate loss, stabilize clays, flocculate drilled solids, increase carrying capacity, emulsify, lubricate and the like. Among the most commonly employed polymeric additives are starches, guar gum, xanthan gum, sodium carboxy-methylcellulose (CMC), hydroxyethylcellulose (HEC), carboxy methyl hydroxyethylcellulose (CMHEC) and synthetic water dispersible polymers such as acrylics and alkylene-oxide polymers.

Also well known and important for their ability to reduce flow resistance and gel development in clay water muds are materials which are broadly referred to in the drilling fluid industry as "dispersants". Materials conventionally used as dispersants are classified as plant tannins, polyphosphates, lignitic materials, synthetic water dispersible polymers and lignosulfonates.

When the drilling of the borehole is completed, a casing is secured in position within the borehole to insure permanence of the borehole and to prevent entry into the well of a fluid from a formation other than the formation which is being tapped. The well casing is typically cemented in place by pumping a cement slurry downwardly through the casing. The cement slurry flows out of the open lower end of the casing at the well bottom and then upwardly around the casing in the annular space between the outer wall of the casing and the wall of the well borehole. Frequently, a spacer fluid is pumped downwardly through the casing ahead of the cement slurry to form a buffer between and to prevent the contact of the drilling fluid and the cement slurry which are typically incompatible fluids.

The drilling process which produces the borehole will usually leave behind on the wall of the borehole produced, a drilling fluid filter cake of mud-like material. This material is a barrier to the formation of proper bonding by any cement composition employed to produce an impermeable bond between the casing and the well wall.

In an ideal cementing operation the drilling fluid filter cake would be removed from the well bore wall and replaced by the cement slurry to permit the formation of a solid layer of hardened, cured and bonded cement between the casing and the geologic formations through which the well borehole passes. It has been recognized in the art that removal of the drilling fluid filter cake is greatly enhanced by injecting the cement slurry, spacer fluids or the like into the well borehole under turbulent flow conditions.

Inducing turbulence by control of flow velocity alone requires a specific minimum velocity, which in turn is limited by the maximum pressure the wellbore can tolerate. Particularly, where the turbulence induced is sufficient to assure removal of the drilling fluid filter cake, additional pumping capacity and very high pressure levels are usually required. These required pressure levels, especially for deep wells, often exceed the pressure at which the subterranean formations break down, resulting in lost circulation. In addition, the required pressure level may exceed the capacity of the pumping equipment or the endurance of the well drilling and associated apparatus.

The pumping of cement slurries in turbulent flow at lower flow velocities than would be possible using conventional cement slurry compositions, has been accomplished in the prior art by adding to the said cement slurries a flow property-improving and turbulence-inducing agent, which agent is also known as a dispersant.

After the drilling of the borehole is completed and the casing is cemented in position within the borehole, the casing is perforated to permit recovery of a fluid mineral. Frequently, a completion fluid is disposed within the borehole to maintain a hydrostatic head during the perforation process. Some common completion fluids are clear brines and bland drilling fluids.

In the cementing of oil and gas wells, rather than displacing and removing the drilling fluid during cement slurry placement, it has been proposed to convert the drilling fluid to a cementitious slurry for cementing casing or tubing in place or otherwise stabilizing or protecting the casing by sealing the formation in the vicinity of the borehole.

The conversion of drilling fluid or "mud" to a cement slurry, however, is not without some operational problems and undesirable compositional changes. For example, the addition of cementitious materials such as mixtures of lime, silica and alumina, or lime and magnesia, silica and alumina and iron oxide, or cement materials such as calcium sulphate and Portland cements to aqueous drilling fluids can substantially increase the viscosity of the fluid mixture and result in severe flocculation. Efforts to circulate such mixtures through a wellbore can result in a highly unsatisfactory circulation rate, plugging of the wellbore annulus, breakdown of the earth formation in the vicinity of the wellbore and a failure of the cement slurry to properly mix.

These problems can be overcome by the addition of a dispersant composition which disperses both the drilling fluid and the cement slurry and allows mixtures of drilling fluids and cement slurries to be pumpable. However, conventional drilling fluid dispersants do not necessarily disperse cement slurries and conventional cement slurry dispersants do not necessarily disperse drilling fluids. In addition, conventional dispersants which do disperse both drilling fluids and cement slurries do not necessarily disperse mixtures of drilling fluids and cement slurries.

U.S. Pat. No. 3,730,900 discloses that sulfonated styrene maleic anhydride copolymer (SSMA) provides colloidal stabilization in aqueous drilling fluids. U.S. Pat. Nos. 3,952,805 and 4,036,660 disclose that SSMA acts as a flow-property improving and turbulence-inducing additive in cement slurries. U.S. Pat. Nos. 4,883,125, discloses that SSMA acts as a dispersant for mixtures of drilling fluids and cement slurries in a mud-to-cement conversion process.

U.S. Pat. No. 2,650,905 discloses that sulfonated polystyrene and copolymers of sulfonated styrene with maleic acid, fumaric acid, acrylic acid and methacrylic acid and their alkali metal and ammonium salts provide fluid-loss control in drilling fluids. U.S. Pat. No. 2,718,497 discloses that polyacrylic acid, acrylic acid-fumaric acid copolymer, polymethacrylic acid, acrylic acid-isobutylene copolymer, isobutylene-maleic anhydride and isobutylene-maleic acid copolymer and their alkali and ammonium salts provide fluid-loss control in drilling fluids.

U.S. Pat. Nos. 3,234,154 and 3,409,080 disclose that sulfonated polystyrene and polyvinyl alcohol provide fluid-loss control in and reduce the setting time of cement slurries.

Dispersant compositions typically exhibit varying properties and performance under different conditions. The performance of dispersant compositions may be evaluated in applications such as, drilling fluid dispersion, mud-to-cement dispersion, cement dispersion, low salt-low hardness mud dispersion, high salt-high hardness mud dispersion and at high temperature in all of the preceding applications.

The present invention has been developed with a view to providing improved dispersant compositions that control rheological properties of, enhance filtrate control in, and disperse one or more of drilling fluids, spacer fluids, completion fluids, cement slurries and mixtures of drilling fluids and cement slurries.

SUMMARY OF THE INVENTION

The present invention provides compositions for dispersing one or more of drilling fluids, spacer fluids, completion fluids, cement slurries and mixtures of drilling fluids and cement slurries. The dispersant compositions control rheological properties of and enhance filtrate control in drilling fluids, spacer fluids, completion fluids, cement slurries and mixtures of drilling fluids and cement slurries.

According to the present invention, the dispersants comprise a copolymer of a first monomer and a second monomer, wherein the first monomer is maleic anhydride, maleic acid, acrylic acid, or methacrylic acid and the second monomer is sulfonated ethene, sulfonated propene, sulfonated 1-butene, sulfonated 2-butene, sulfonated 1-pentene, sulfonated 2-pentene, sulfonated 2 methyl-1-butene, sulfonated 2-methyl-2-butene, sulfonated 3-methyl 1 butene, sulfonated cyclopentene, sulfonated cyclohexene, sulfonated 1 hexene, sulfonated 2-hexene, sulfonated 3-hexene, sulfonated 2-methyl-1-pentene, sulfonated 2-methyl-2-pentene, sulfonated 2-methyl-3-pentene, sulfonated 3-methyl-1-pentene, sulfonated 3-methyl-2-pentene, sulfonated 4-methyl-1-pentene, sulfonated 3,3-dimethyl-1-butene, sulfonated 2,3-dimethyl 1-butene, sulfonated 2,3 dimethyl-2-butene, sulfonated 2-ethyl-1-butene, sulfonated 1,3-butadiene, sulfonated 1,3-pentadiene, sulfonated 1,4-pentadiene, sulfonated 2-methyl-1,3-butadiene, sulfonated 2,3-dimethyl-1,3-butadiene, sulfonated 2-ethyl-butadiene, sulfonated 2-methyl-1,3-pentadiene, sulfonated 3-methyl-1,3-pentadiene, sulfonated 4-methyl1,3-pentadiene, sulfonated 2-methyl-1,4-pentadiene, sulfonated 3-methyl 1,4-pentadiene, sulfonated 4-methyl-1,4-pentadiene, sulfonated 1,3-hexadiene, sulfonated 1,4-hexadiene, sulfonated 1,5-hexadiene, sulfonated 2,4-hexadiene, or sulfonated 1,3,5-hexatriene. The sulfonate and carboxylate groups on the copolymers may be present in neutralized form as alkali metal or ammonium salts. The copolymers of the present invention, preferably, include molar ratios of the first monomer to the second monomer ranging from 10:1 to 1:10.

Those skilled in the art will further appreciate the above-described features of the present invention together with other superior aspects thereof upon reading the detailed description which follows.

DESCRIPTION OF PREFERRED EMBODIMENTS

The present invention relates to dispersants that control the rheological properties of, enhance filtrate control in, and disperse one or more of drilling fluids, spacer fluids, completion fluids, cement slurries and mixtures of drilling fluids and cement slurries.

According to the present invention, the molecular weight of the dispersants preferably is in the range of 1,000–20,000, and most preferably, is in the range of 2,000–12,000.

In addition, it is preferred that the dispersants have a high density of anionic charge, because the surface of the particles to be dispersed have some degree of positive charge. It is also preferred that the dispersants include an anionic charge supplying functional group such as a sulfonate or carboxylate group.

In drilling fluids, spacer fluids, completion fluids and mixtures which include drilling fluids, it is preferred that the dispersants contain a sulfonate group when good salt tolerance is desired. It is contemplated that when good salt tolerance is desired, the dispersants include a sulfonate group in conjunction with polar nonionic groups, hydroxyl groups, aliphatic ester groups and alkylene oxide groups. In addition, the more salt tolerant dispersants tend to have fewer carboxylate groups which are more sensitive to divalent ions than are sulfonate groups.

In cement slurries and mixtures of drilling fluids and cement slurries, it is preferred that the dispersants contain a carboxylate group which has a high affinity for the calcium molecules contained in the cement slurry.

According to the present invention the dispersants comprise a copolymer of a first monomer and a second monomer, wherein the first monomer is maleic anhydride, maleic acid, acrylic acid, or methacrylic acid and the second monomer is sulfonated ethene, sulfonated propene, sulfonated 1-butene, sulfonated 2 butene, sulfonated 1 pentene. sulfonated 2-pentene, sulfonated 2-methyl-1-butene, sulfonated 2-methyl-2 butene. sulfonated 3-methyl 1-butene, sulfonated cyclopentene, sulfonated cyclohexene, sulfonated 1-hexene, sulfonated 2-hexene, sulfonated 3-hexene, sulfonated 2-methyl-1-pentene, sulfonated 2-methyl-2-pentene, sulfonated 2-methyl 3-pentene, sulfonated 3-methyl-1-pentene, sulfonated 3-methyl-2-pentene, sulfonated 4-methyl-1-pentene, sulfonated 3,3-dimethyl-1-butene, sulfonated 2,3-dimethyl-1-butene, sulfonated 2,3-dimethyl-2-butene, sulfonated 2-ethyl-1-butene, sulfonated 1,3-butadiene, sulfonated 1,3-pentadiene, sulfonated 1,4-pentadiene, sulfonated 2-methyl-1,3-butadiene, sulfonated 2,3-dimethyl-1,3-butadiene, sulfonated 2-ethyl-butadiene, sulfonated 2-methyl-1,3-pentadiene, sulfonated 3-methyl-1,3-pentadiene, sulfonated 4-methyl1,3-pentadiene, sulfonated 2-methyl-1,4-pentadiene, sulfonated 3-methyl-1,4-pentadiene, sulfonated 4-methyl-1,4-pentadiene, sulfonated 1,3-hexadiene, sulfonated 1,4-hexadiene, sulfonated 1,5-hexadiene, sulfonated 2,4-hexadiene, or sulfonated 1,3,5-hexatriene. The sulfonate and carboxylate groups on the copolymers may be present in neutralized form as alkali metal or ammonium salts. The copolymers of the present invention, preferably, include molar ratios of the first monomer to the second monomer ranging from 10:1 to 1:10.

According to a preferred embodiment of the present invention, the first monomer is maleic anhydride.

The water-solubility of the dispersants according to the present invention is influenced by both the molecular weight of the polymer and the presence of sulfonate or carboxylate qroups on the polymer. As the molecular weight of the polymers increases their water-solubility decreases. As noted above, the polymers have a molecular weight, preferably, in the range of 1,000 to 20,000 and, most preferably, in the range of 2,000 to 12,000. The above molecular weight ranges are before sulfonation and, accordingly, do not include the weighting of these groups.

The sulfonate or carboxylate groups improve the water solubility of the polymers. When desired, the polymers of the present invention contain a sufficient number of sulfonate or carboxylate groups to render the polymer water soluble.

The copolymers of the present invention can be prepared by conventional polymerization techniques such as those described in Witcoff, Harold, ed. *Industrial Organic Chemicals in Perspective Part One: Raw Materials and Manufacture*, New York, N.Y., John Wiley & Sons, Inc., 1980, the disclosure of which is specifically incorporated herein by reference, which techniques will produce a polymer having the desired characteristics, and which techniques are well known to those of ordinary skill in the art. The polymers may be sulfonated as desired according to techniques well known to those of ordinary skill in the art such as those described in March, Jerry, ed. *Advanced Organic Chemistry* 2nd Ed., McGraw-Hill, Inc., 1977, and in U.S. Pat. No. 4,797,450, the disclosures of which are specifically incorporated herein by reference.

The sulfonate and carboxylate qroups on the polymers of the present invention, preferably are present in neutralized form as alkali metal or ammonium salts.

The dispersants, preferably, are added to drilling fluids, spacer fluids, completion fluids, cement slurries and mixtures of drilling fluids and cement slurries, as the case may be, at the rate of between 0.1 and 20.0 lbs. per 42-gallon barrel (ppb) of the original fluid and preferably between 1.0 and 10.0 ppb.

The dispersants of the present invention have utility in one or more of drilling fluids, spacer fluids, completion fluids, cement slurries and mixtures of drilling fluids and cement slurries.

When added to drilling fluids, spacer fluids and completion fluids, the dispersants modify the rheological properties of the fluids and result in fluids having a plastic viscosity of from 3 to 70 centipoises, preferably, from 5 to 50 centipoises and a yield point of from 2 to 50 lbs/100 ft$^2$, preferably, from 5 to 30 lbs/100 ft$^2$.

When added to cement slurries and mixtures of drilling fluids and cement slurries, the dispersants modify the rheological properties of the fluids and result in fluids having a plastic viscosity of from 10 to 400 centipoises, preferably, from 20 to 200 centipoises and a yield point of from 0 to 100 lbs/100 ft$^2$, preferably, from 5 to 50 lbs/100 ft$^2$.

Although preferred embodiments of the present invention have been described in some detail herein, various substitutions and modifications may be made to the compositions of the invention without departing from the scope and spirit of the appended claims.

What is claimed is:

1. A method of converting a drilling fluid to a cement slurry for securing a casing within a borehole wherein said casing has an inner and outer wall and wherein said borehole defines an annular space about said outer wall of said casing, said annular space being occupied by said drilling fluid, said method comprising:
   (1) adding a cementitious material to said drilling fluid; and
   (2) adding a polymeric dispersant to said drilling fluid, said polymeric dispersant comprising a first monomer and a second monomer, wherein said first monomer comprises maleic anhydride and wherein said second monomer is selected from the group consisting of sulfonated ethene, sulfonated propene, sulfonated 1-butene, sulfonated 2-butene, sulfonated 1-pentene, sulfonated 2-pentene, sulfonated 2-methyl-1-butene, sulfonated 2-methyl-2-butene, sulfonated 3-methyl-1-butene, sulfonated cyclopentene , sulfonated cyclohexene, sulfonated 1-hexene, sulfonated 2-hexene, sulfonated 3-hexene, sulfonated 2-methyl-1pentene, sulfonated 2-methyl-2-pentene, sulfonated 2-methyl-3-pentene, sulfonated 3-methyl-1-pentene, sulfonated 3-methyl-2-pentene, sulfonated 4-methyl-1-pentene, sulfonated 3,3-dimethyl-1-butene, sulfonated 2,3-dimethyl-1-butene, sulfonated 2,3-dimethyl-2-butene, sulfonated 2-ethyl-1-butene, sulfonated 1,3-butadiene, sulfonated 1,3-pentadiene, sulfonated 1,4-pentadiene, sulfonated 2-methyl-1,3-butadiene, sulfonated 2,3-dimethyl-1, 3-butadiene, sulfonated 2-ethyl-butadiene, sulfonated 2-methyl-1,3-pentadiene, sulfonated 3-methyl-1,3-pentadiene, sulfonated 4-methyl-1,3-pentadiene, sulfonated 2-methyl-1,4-pentadiene, sulfonated 3-methyl-1,4-pentadiene, sulfonated 4-methyl-1,4-pentadiene, sulfonated 1,3-hexadiene, sulfonated 14,-hexadiene, sulfonated 1,5-hexadiene, sulfonated 2,4-hexadiene, and sulfonated 1,3,5-hexatriene.

2. A method according to claim 1, wherein said drilling fluid comprises from 0.1 to 20.0 pounds of said dispersant copolymer per 42.0 gallons of said drilling fluid.

3. A method according to claim 2, wherein said drilling fluid comprises from 1.0 to 10.0 pounds of said dispersant copolymer per 42.0 gallons of said drilling fluid.

4. A fluid, comprising:
a mixture of a drilling fluid and a cement slurry; and
a dispersant copolymer comprising a first monomer and a second monomer, wherein said first monomer comprises maleic anhydride and wherein said second monomer is selected from the group consisting of sulfonated ethene, sulfonated propene, sulfonated 1-butene, sulfonated 2-butene, sulfonated 1-pentene, sulfonated 2-penetene, sulfonated 2-methyl-1-butene, sulfonated 2-methyl-2-butene, sulfonated 3-methyl-1-butene, sulfonated cyclopentene, sulfonated cyclohexene, sulfonated 1-hexene, sulfonated 2-hexene, sulfonated 3-hexene, sulfonated 2-methyl-1-pentene, sulfonated 2-methyl-2-pentene, sulfonated 2-methyl-3-pentene, sulfonated 3-methyl-1-pentene, sulfonated 3-methyl-2-pentene, sulfonated 4-methyl-1-pentene, sulfonated 3,-dimethyl-1-butene, sulfonated 2,3-dimethyl-1-butene, sulfonated 2,3-dimethyl-2-butene, sulfonated 2-ethyl-1-butene, sulfonated 1,3-butadiene, sulfonated 1,3-pentadiene, sulfonated 1,4-pentadiene, sulfonated 2-methyl-1,3-butadiene, sulfonated 23,-dimethyl-1,3-butadiene, sulfonated 2-ethylbutadiene, sulfonated 2-methyl-1,3-pentadiene, sulfonated 3-methyl-1,3-pentadiene, sulfonated 4-methyl-1,3-pentadiene, sulfonated 2-methyl-1,4-pentadiene, sulfonated 3-methyl-1,4-pentadiene, sulfonated 4-methyl-1,4-pentadiene, sulfonated 1,3-hexadiene, sulfonated 2,4-hexadiene, and sulfonated 1,3,5-hexatriene.

5. A fluid according to claim 4, wherein said dispersant copolymer comprises one or more of an acid group selected from the group consisting of sulfonic acid and carboxylic acid and wherein one or more of said acid groups are present in neutralized form as alkali metal salts or ammonium salts.

6. A fluid according to claim 4, wherein said dispersant copolymer comprises a molar ratio of said first monomer to said second monomer of from 10:1 to 1:10.

7. A fluid according to claim 4, wherein said fluid comprises from 0.1 to 20.0 pounds of said dispersant copolymer per 42.0 gallons of said fluid.

8. A fluid according to claim 7, wherein said fluid comprises from 1.0 to 10.0 pounds of said dispersant copolymer per 42.0 gallons of said fluid.

9. A composition, comprising:
a cement slurry; and
a dispersant copolymer comprising a first monomer and a second monomer, wherein said first monomer comprises maleic anhydride and wherein said second monomer is selected from the group consisting of sulfonated ethene, sulfonated propene, sulfonated 1-butene, sulfonated 2-butene, sulfonated 1-pentene, sulfonated 2-pentene, sulfonated 2-methyl-1-butene, sulfonated 2-methyl-2-butene, sulfonated 3-methyl-1-butene, sulfonated cyclopentene, sulfonated cyclohexene, sulfonated 1-hexene, sulfonated 2-hexene, sulfonated 3-hexene, sulfonated 2-methyl-1-pentene, sulfonated 2-methyl-2-pentene, sulfonated 2-methyl-3-pentene, sulfonated 3-methyl-1-pentene, sulfonated 3-methyl-2-pentene, sulfonated 4-methyl-1-pentene, sulfonated 3,3-dimethyl-1-butene, sulfonated 2,3-dimethyl-1-butene, sulfonated 2,3-dimethyl-2-butene, sulfonated 2-ethyl-1-butene, sulfonated 1,3-butadiene, sulfonated 1,3-pentadiene, sulfonated 1,4-pentadiene, sulfonated 2-methyl-1,3-butadiene, sulfonated 2,3-dimethyl-1, 3-butadiene, sulfonated 2-ethylbutadiene, sulfonated 2-methyl-1,3-pentadiene, sulfonated 3-methyl-1,3-pentadiene, sulfonated 4-methyl-1,3-pentadiene, sulfonated 2-methyl-1,4-pentadiene, sulfonated 3-methyl-14,-pentadiene, sulfonated 4-methyl-1,4-pentadiene, sulfonated 1,3-hexadiene, sulfonated 1,4-hexadiene, sulfonated 1,5-hexadiene, sulfonated 2,4-hexadiene, and sulfonated 1,3,5-hexatriene.

10. A composition according to claim 9, wherein said dispersant copolymer comprises one or more of an acid group selected from the group consisting of sulfonic acid and carboxylic acid and wherein one or more of said acid groups are present in neutralized form as alkali metal salts or ammonium salts.

11. A composition according to claim 9, wherein said dispersant copolymer comprises a molar ratio of said first monomer to said second monomer of from 10:1 to 1:10.

12. A composition according to claim 9, wherein said composition comprises from 0.1 to 20.0 pounds of said dispersant copolymer per 42.0 gallons of said cement slurry.

13. A composition according to claim 12, wherein said composition comprises from 1.0 to 10.0 pounds of said dispersant copolymer per 42.0 gallons of said cement slurry.

* * * * *